UNITED STATES PATENT OFFICE.

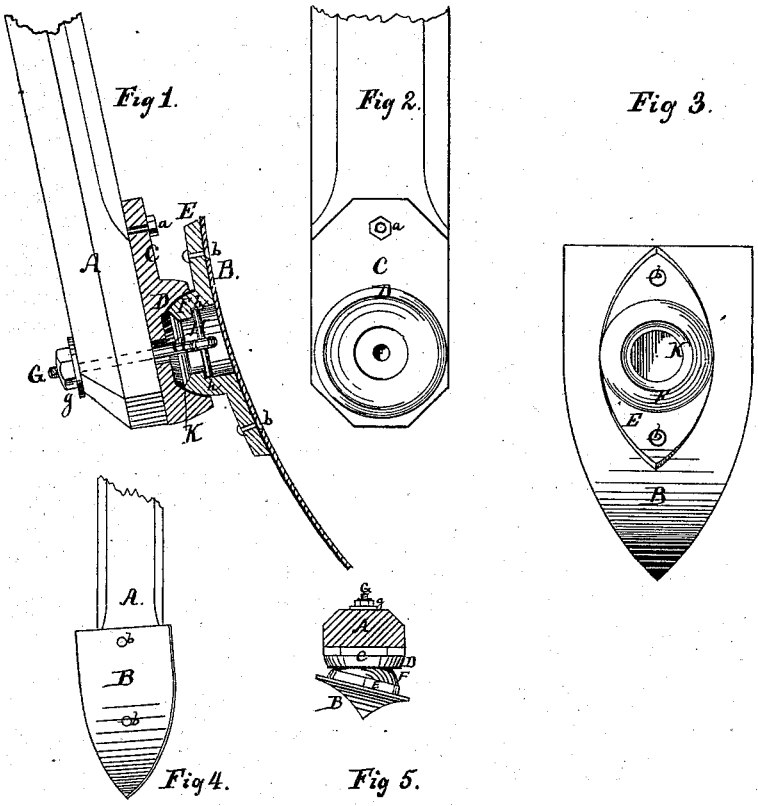

EDWIN CHILDREN, OF DUNLEITH, ILLINOIS.

IMPROVEMENT IN COUPLING-JOINTS FOR CULTIVATOR-TEETH.

Specification forming part of Letters Patent No. 158,906, dated January 19, 1875; application filed October 9, 1874.

CASE B.

*To all whom it may concern:*

Be it known that I, EDWIN CHILDREN, of Dunleith, in the county of Jo Daviess and State of Illinois, have invented certain Improvements in Attaching Cultivator-Shovels, of which the following is a specification:

The object sought to be accomplished by this invention is to produce a perfect adjustability of the cultivator-shovel upon its standard, whereby it may be turned in any direction, and set to accommodate any circumstance of usage; and the invention consists in applying to the standard a casting with a concave hemispherical cavity fitted to receive a hemispherical projection upon the back of the shovel, or rather upon a casting attached thereto by rivets or bolts, and in coupling the shovel to the standard by a single eyebolt or equivalent contrivance, as will be more fully understood by the subsequent description, whereby a partial ball-and-socket joint is produced capable of being locked by the eyebolt in any desired position.

In the accompanying drawing, which forms a part of this specification, Figure 1 is a side view of the lower part of a standard having a shovel attached by my improved coupling, the shovel and joint being shown in section. Fig. 2 is a face view of the standard and its half of the joint. Fig. 3 is a rear view of the shovel and its half of the joint. Fig. 4 is a front view, upon a lesser scale, of shovel and standard united. Fig. 5 is a plan view of same, the standard being taken in section just above the shovel.

Like letters of reference made use of in the several figures indicate like parts wherever used.

In said drawing, A represents the standard, and B is the shovel. Upon the front of the standard, at the bottom, I secure (preferably by a single bolt, $a$,) the casting C, made with a hemispherical or cup-shaped cavity, D. Upon the back of the shovel I secure (preferably by rivets $b$) the casting E, made with a rounded or bowl-shaped projection, F, corresponding in size and shape with the cavity D. This projection F is chambered out to receive the eye and shank of an eyebolt, G, shackeled in place by a thwart-pin, H, which, for further security, (as it is loose,) rests in notches $h\ h$ in the chamber. The chamber J opens with a circular aperture, K, so that there is no interference with the bolt when the joint is operated, and also to facilitate or enable the insertion of the eyebolt. This eyebolt G passes back through the standard, and is furnished with a nut, $g$, with which the parts of the joint may be drawn together and secured, when adjusted, to the desired position.

It will be seen that, with this joint, the shovel may be adjusted at any desired lateral inclination, and the point of the shovel preserved always in the line of draft—that is to say, in a straight line with the center of the standard—whereby the shovel is caused to scour more perfectly, and the point, upon occasion, kept away from the roots of the young corn.

It will also be seen that I am enabled, by this universal joint, to give the shovel more or less vertical inclination, to make it take more or less into the earth without the necessity of adjusting the entire standard. In short, each shovel is perfectly and independently adjustable, and the entire series belonging to a single cultivator may be separately and individually adjusted to suit any circumstance, or any peculiarity of the draft or occasion.

Having thus fully described the construction and operation of my invention, I claim as new and desire to secure by Letters Patent—

The coupling-joint herein described, consisting of the casting C, made with the concave cavity D, the casting E, made with the convex projection F, the eyebolt G, passing through the nut $g$, and through or thwart pin H, passing through the eye of said bolt and resting on the notches $h\ h$, attached and connecting and in combination with the standard A and shovel B, substantially as specified.

E. CHILDREN.

Witnesses:
JOHN W. MUNDAY,
EDW. S. EVARTS.